Patented Sept. 11, 1951

2,567,698

UNITED STATES PATENT OFFICE 2,567,698

PRODUCTION OF BACITRACIN

Grant D. Darker, Maple Heights, Ohio, assignor to Ben Venue Laboratories, Incorporated, Pittsburgh, Pa., a corporation of Pennsylvania No Drawing. Application June 29, 1949, Serial No. 102,159

10 Claims. (Cl. 195—96)

This invention relates to culture media and to the production of desired products of metabolism of microorganisms in such media, and more particularly to media for the production of bacitracin from strains of B. subtilis group that are productive of it.

This application is a continuation-in-part of a copending application Serial No. 703,478, filed October 16, 1946, by me jointly with John T. Goorley, George W. Buckaloo, Alfred H. Free and James H. Jenkins. That application makes general reference to bacitracin, its source, and its then known properties. In particular it points to the fact that when that application was filed the methods used previously for the production and recovery of this new antibotic were not fully satisfactory, in that the media used previously gave relatively low yields of bacitracin per unit of broth and were relatively expensive, and in that the recovery methods used theretofore were unsatisfactory. The application describes and claims a novel mode of recovering bacitracin from liquid media in accordance with which the liquid medium containing bacitracin is contacted with an adsorbent for bacitracin, such as activated carbon, and the adsorbent is then eluted with a two-phase mixture of an aqueous acid solution and an inert organic solvent, which results in transfer of the bacitracin from the adsorbent to the eluant from which it may then be recovered and purified, if necessary.

Serial No. 703,478 discloses likewise the particular utility of culture media comprising soybean meal for the propagation of B. subtilis group organisms productive of bacitracin. The application discloses also such a culture medium containing calcium gluconate. Such culture media constituted an invention made solely by me, i. e., they are not an invention made jointly by the applicants for the aforesaid copending application.

It is accordingly an object of the present invention to provide culture media for the propagation of microorganisms, and particularly, for bacitracin-producing strains of the B. subtilis group, that is of simple composition, is easily prepared from readily available materials, and is productive of higher assays than the media previously available.

A further object is to provide a method of propagating microorganisms, and particularly bacitracin-producing strains of the B. subtilis group, to produce desired metabolic products that is simple, is easily practiced, and makes use of media in accordance with the foregoing object.

Still another object is to provide media and processes in accordance with the foregoing objects and in which soybean meal forms an essential basal nutrient constituent.

Other objects will appear from the following description.

I have discovered, and it is upon this that the invention is in large part predicated, that superior results attend the production of bacitracin by the use of culture media comprising soybean and certain inorganic salts of organic acids. More particularly, the media of this invention comprise, as such essential ingredients, soybean in combination with at least one alkali or alkaline earth salt of a fatty acid. I have found that when media comprising the combination of soybean and the said salts are inoculated with strains of the B. subtilis group productive of bacitracin and then incubated, higher assays of bacitracin result than were produced using the media known or used for this purpose prior to my invention.

The soybean that forms one of the basic constituents of my media may be provided in the form of the well known soybean meal, most suitably in its defatted form. It is unnecessary to use it in the form of the hydrolysate that has been proposed or tried in culture media. Soybean, as is well known, contains both protein material and a substantial proportion of carbohydrate materials of diverse natures such, for example, as celluloses, sugars, glycosides, and other forms, examples being stachyose, glucose, gelactan, sucrose, dextrin, araban, and starch or starch-like material. Thus soybean furnishes both the carbon and the nitrogen compounds necessary in culture media. The media in accordance with the invention are, of course, made up with water. Satisfactory results may be had with a suspension of 3.5 per cent by weight of the meal in water, although for many purposes I prefer a 5 per cent by weight suspension. Larger amounts might be used provided the consistency of the medium is not rendered unsatisfactory, but in general such larger amounts are unnecessary and uneconomical. Smaller amounts may be used also, especially if other nutrients such as starch are added to the medium.

A variety of alkali and alkaline earth salts of fatty acids may be used in the practice of the invention to supply the other essential basic constituent, examples being the ammonium, sodium, potassium and calcium salts of fatty acids. For the purposes of this invention ammonium salts are classed with the alkali metal salts, which is appropriate in view of the analytical and other relationships between ammonium salts and the salts of the alkali metals. The salt may be one of a simple fatty acid, such, for example, as acetic acid or stearic acid. Or, it may be the salt of a dibasic acid such as oxalic acid or succinic acid. In the preferred embodiment, however, there is used at least one salt of a hydroxy fatty acid, more particularly gluconic and lactic acids, although other hydroxy fatty acids may equally be used, for example, the salts of tartaric acid and citric acid. The amount of such salt or salts used may be varied depending upon factors known to those working in the field of microbiology, e. g., such factors as the particular salt used, the other components of the medium, the organism to be propagated, etc.

The use of these media will be perfectly understood by those familiar with the art so that it will suffice simply to state that in producing bacitracin the sterile medium is inoculated with a bacitracin-producing strain of the *B. subtilis* group followed by incubation, either in surface or submerged growth. These features are not critical, the exact time and temperature of incubation depending upon such factors as the exact composition of the culture medium, the productivity of the organism, and the titer desired. Desirably, however, the bacitracin is harvested when the maximum assay has been reached, which is readily determined by periodic assays, as by the plate-cup method. When the medium reaches maximum titer the bacitracin is harvested, as by separating the liquid from the surface pellicle, if any is present, and then treating the medium to recover the bacitracin, which may be accomplished suitably by the method described in the aforesaid application Serial No. 703,478. Briefly, that involves acidifying the broth to precipitate protein, as by the progressive addition of acid to bring the broth to a pH of about 3.5. The broth is then filtered and the filtrate is neutralized with an alkali, after which it is treated with activated carbon or other adsorbent for bacitracin. The activated carbon is then washed with water and the washings are discarded, following which it is eluted as referred to above, preferably with an aqueous 0.1 N HCl solution mixed with butanol in an amount in excess of its solubility in the acid solution. The eluants are then neutralized with an alkali and the resulting aqueous phase is extracted with butanol whereby the bacitracin passes into it. The butanol extract is then purified, as by contacting it with an adsorbent to remove impurities. After filtration the butanol solution is extracted with water and an immiscible organic solvent, such as chloroform or ethyl ether, which causes the bacitracin to enter the water phase which may then be concentrated to recover the antibiotic.

Of course, as indicated above, the media may be used to propagate other organisms than those of the *B. subtilis* group.

The invention will be understood further by reference to the following examples. In these examples the sterile medium was inoculated with a sub-strain, termed AB, of the Tracy strain of the *B. subtilis* group that is productive of bacitracin. The following data all represent incubation for 5 days, unless noted otherwise.

*Example 1*

The basic medium comprised 50 gm. of soybean meal and 0.5 gm. NaOH per liter of tap water.

| Medium | Assay |
| --- | --- |
| Basic Medium | 15.2 |
| Basic Medium plus 30 gm. calcium gluconate | 40.0 |

*Example 2*

| Soybean Flour | Calcium Lactate | Assay |
| --- | --- | --- |
| Grams per liter | Grams per liter | |
| 50 | 0 | 11.0 |
| 0 | 50 | 0 |
| 40 | 10 | 35.0 |
| 30 | 25 | 46 |

It will be observed from this example that with a medium containing calcium lactate alone no bacitracin was produced after 5 days of incubation, and that the assay of bacitracin with a simple soy bean medium was low after incubation for the same period of time. However, media combining both essential ingredients of this invention gave yields of three and four times that with soybean alone.

*Example 3*

Basic medium 50 gm. of soybean meal per liter of tap water to which the following salts were added:

| Medium | Assay |
| --- | --- |
| Ammonium Tartrate, 10 gm | 19.2 |
| Potassium Citrate, 30 gm | 43.0 |
| Sodium Acetate, 10 gm | 42.0 |
| Sodium Oxalate, 30 gm | 34.0 |
| Sodium Tartrate, 30 gm | 28.0 |

As appears from Examples 1 and 2, which are indicative of the assays obtained with the soybean medium without added fatty acid salt, it will be observed that in each of these cases in which the medium contained likewise a salt in accordance with this invention, the assays were increased many times.

*Example 4*

As indicated above, the media provided by this invention and used in the practice of its method may contain more than one of the salts the use of which characterizes the invention. For instance, a medium containing 50 gm. of soybean meal per liter of tap water, together with 10 gm. each of calcium gluconate and calcium lactate, inoculated with the said AB sub-strain assayed 40.2 units of bacitracin after 5 days, and 88.0 units after 7 days incubation.

There may, if desired, be added also to the medium mineral nutrient salts such as are commonly used with culture media. As an example reference may be made to the following medium that has been found suitable for the production of bacitracin:

| | | |
|---|---|---|
| Soybean meal | gm | 35.0 |
| Calcium gluconate | gm | 30.0 |
| $KH_2PO_4$ | gm | 0.7 |
| $MgSO_4.7H_2O$ | gm | 0.5 |
| KCl | gm | 0.35 |
| $CaCl_2$ | gm | 0.25 |
| $FeSO_4.7H_2O$ | gm | 0.01 |
| $MnSO_4.4H_2O$ | gm | 0.01 |
| NaOH | gm | 0.25 |
| Water | ml | 1000.0 |

Other salts of fatty acids in accordance with the invention may be used in place of or in addition to the calcium gluconate of the foregoing formula, satisfactory results having been had with such salts as sodium succinate, sodium acetate and calcium lactate. I have found likewise that calcium carbonate is a particularly desirable adjuvant to the basic media provided by the present invention. Starch may be added also to the media provided by the invention.

Although the invention has been described with particular reference to the use of the media described for the production of bacitracin, the media may equally be used for the propagation of other microorganisms. Likewise, other strains of *B. subtilis* than the sub-strain AB of the Tracy strain may be used to produce bacitracin.

The invention is predicated further on my discovery that the addition of the alkali metal and alkaline metal salts of fatty acids to other culture media results equally in improved assays.

*Example 5*

This made use of a tyrothricin medium of the following composition: N-Z-amine, 15 gm.; glucose, 30 gm.; $KH_2PO_4$, 0.7 gm.; KCl, 0.35 gm.; $MgSO_4.7H_2O$, 0.5 gm.; $CaCl_2$, 0.25 gm.;

$FeSO_4.7H_2O$ 0.01 gm.; $MnSO_4.7H_2O$, 0.01 gm.; tap water, 1000 ml.

| Medium | Assay |
|---|---|
| Basic Medium | 0 |
| Basic Medium plus 15 gm. calcium lactate | 15.6 |

The N-Z-amine and soybean are both proteinaceous, or amino, substances.

*Example 6*

Basic medium 50 gm. whole wheat flour per liter tap water:

| Medium | Assay |
|---|---|
| Basic Medium | 0 |
| Basic Medium plus 15 gm. calcium lactate | 18.5 |

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of producing bacitracin comprising the steps of inoculating with a bacitracin producing strain of *B. subtilis* a culture medium comprising, as essential ingredients, soybean meal and a substance of the group consisting of alkali and alkaline earth salts of fatty acids, and then incubating the inoculated medium.

2. A method according to claim 1, said salt being calcium lactate.

3. A method according to claim 1, said salt being calcium gluconate.

4. A method according to claim 1, said medium containing calcium lactate and also added starch.

5. A method according to claim 1 in which said salt is calcium lactate, and the medium contains also calcium carbonate.

6. A method according to claim 1, said fatty acid being acetic acid.

7. A method according to claim 1, said fatty acid being a hydroxy fatty acid.

8. A method according to claim 1, said substance being a calcium salt of a hydroxy fatty acid.

9. A method according to claim 1, said medium also containing calcium carbonate.

10. A method according to claim 1, said fatty acid being a hydroxy fatty acid and the medium also containing calcium carbonate.

GRANT D. DARKER.

REFERENCES CITED

The following references are of record in the file of this patent:

UNITED STATES PATENTS

| Number | Name | Date |
|---|---|---|
| 2,004,673 | Pieper | June 11, 1935 |
| 2,285,708 | Glynn | June 9, 1942 |
| 2,457,887 | Goorley | Jan. 4, 1949 |
| 2,482,832 | Baron | Sept. 27, 1949 |
| 2,483,248 | Stokes | Sept. 27, 1949 |
| 2,498,165 | Johnson | Feb. 21, 1950 |

OTHER REFERENCES

Porter, op. cit., pp. 680–682. QR, 84, .P75.

Thornberry et al., Arch. Biochem. (1948) 16:389 to 397, QP, 501, .A77.

Dulaney, Jour. Bact., 56, #3, Sept. 148, pp. 305–313, QR, 1, .J8.

Levine, Compilation of Culture Media, Williams & Wilkins, 1930, pp. 158–159.

McMahon, Jour. Bact., Apr. 1944, pp. 400–401.

Porter, Bacterial Chemistry & Physiology, John Wiley & Sons, Inc., p. 674.